United States Patent
Vidal et al.

(10) Patent No.: US 8,815,442 B2
(45) Date of Patent: Aug. 26, 2014

(54) TEXTILE ELECTRODE AND ACCUMULATOR CONTAINING SUCH AN ELECTRODE

(75) Inventors: Elodie Vidal, Montigny sur Loing (FR); Stephane Lascaud, Fontainebleau (FR)

(73) Assignee: Electricite de France, Paris (FR)

( * ) Notice: Subject to any disclaimer, the term of this patent is extended or adjusted under 35 U.S.C. 154(b) by 1643 days.

(21) Appl. No.: 12/301,822

(22) PCT Filed: May 18, 2007

(86) PCT No.: PCT/FR2007/051299
§ 371 (c)(1),
(2), (4) Date: Jul. 6, 2010

(87) PCT Pub. No.: WO2007/135331
PCT Pub. Date: Nov. 29, 2007

(65) Prior Publication Data
US 2010/0273049 A1    Oct. 28, 2010

(30) Foreign Application Priority Data
May 24, 2006    (FR) ...................................... 06 04693

(51) Int. Cl.
*H01M 4/02* (2006.01)
*H01M 4/13* (2010.01)

(52) U.S. Cl.
USPC ............ 429/209; 429/233; 429/241; 429/245

(58) Field of Classification Search
CPC .................. H01M 2004/021; H01M 2004/027; H01M 4/0492; H01M 4/131; H01M 4/485; H01M 4/74; H01M 4/747; Y02E 60/122
USPC .............. 429/238, 233, 235, 237, 209, 218.1, 429/219–231, 247, 241, 245
See application file for complete search history.

(56) References Cited

U.S. PATENT DOCUMENTS

| 6,110,417 A | * | 8/2000 | Sugikawa | 419/2 |
| 2007/0231688 A1 | * | 10/2007 | Grugeon et al. | 429/209 |

FOREIGN PATENT DOCUMENTS

| EP | 0 717 457 | 6/1996 | | |
| EP | 0 936 687 | 8/1999 | | |
| FR | 2 762 142 | 10/1998 | | |
| FR | 2762142 | * 10/1998 | | |
| FR | 2 870 639 | 11/2005 | | |
| JP | 62 198055 | 9/1987 | | |
| JP | 01 239770 | 9/1989 | | |
| KR | 2003 060 165 | 7/2003 | | |
| WO | 94/17224 | 8/1994 | | |
| WO | WO 2005098994 A1 | * 10/2005 | .............. | H01M 2/10 |
| WO | WO 2005114766 A2 | * 12/2005 | .............. | H01M 4/36 |

* cited by examiner

*Primary Examiner* — Basia Ridley
*Assistant Examiner* — Heng Chan
(74) *Attorney, Agent, or Firm* — McAndrews, Held & Malloy Ltd.

(57) ABSTRACT

The invention relates to an electrode comprising (a) an electron collector containing one or more transition metals from the groups 4 to 12 of the Periodic Classification of the Elements, and (b) a material that is electrochemically active, present on the surface of the electron collector in the form of a nano-structured conversion layer containing nano-particles or agglomerates of said nano-particles, wherein the nano-particles have a mean diameter of between 1 and 1000 nm, preferably between 10 and 300 nm, wherein said electrochemically active material contains at least one compound of the transition metal or transition metals present in the electron collector, characterized by the fact that the electrode is a textile formed by metallic wires or fibers. The invention also relates to a half-accumulator and an accumulator containing such a textile electrode.

18 Claims, 1 Drawing Sheet

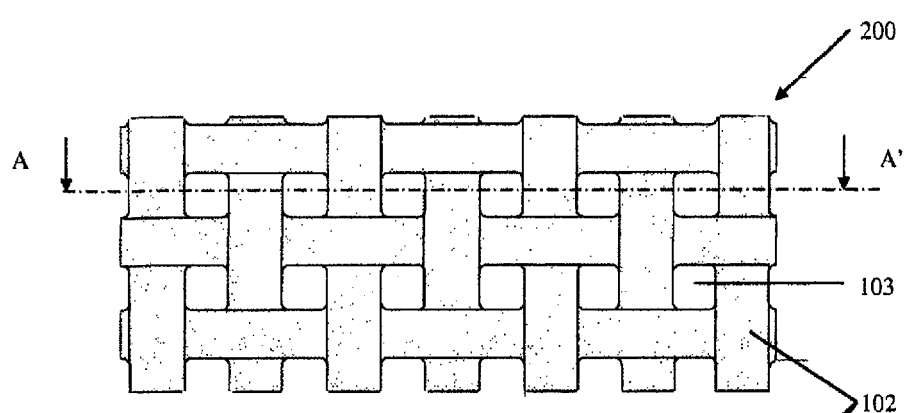
FIG.1A.
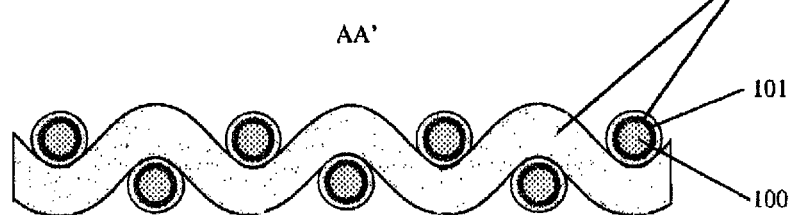
FIG.1B.
FIG.1.

TEXTILE ELECTRODE AND ACCUMULATOR CONTAINING SUCH AN ELECTRODE

The present application is filed pursuant to 35 U.S.C. 371 as a U.S. National Phase application of International Patent Application No. PCT/FR07/51299, which was filed May 18, 2007, claiming the benefit of priority to French Patent Application No. FR 0604693, which was filed on May 24, 2006. The entire text of the aforementioned applications is incorporated herein by reference in its entirety.

The invention relates to a new electrode based on a textile of metal fibers and/or wires with a nanostructured surface, and to a half-accumulator and an accumulator containing such an electrode.

The extraordinary boom in the market for portable electronic devices is giving rise to an increasingly large emulation upstream in the field of rechargeable batteries or accumulators. In addition to the mobile telephone, which has experienced dazzling growth, the sales of portable computers, with an increase of 20% per year, involve new demands for the performance of their power-supply systems. Added to this is also the expansion in the market for camcorders, digital photo devices, CD players, wireless devices and many toys that increasingly commonly require rechargeable batteries. Finally, it is probable that the 21st century will see considerable development of electric vehicles, hybrid vehicles and hybrid vehicles that are rechargeable on the power grid, the emergence of which is resulting from increasingly strict international regulations concerning pollutant emissions and the greenhouse effect from heat engines.

The new generations of electronic devices make necessary the development of accumulators with increased autonomy and having a simultaneously thin and flexible form compatible with the miniaturization of objects. For the market for electric vehicles, hybrid vehicles and hybrid vehicles that are rechargeable on the power grid it is important to have accumulators that are simultaneously light, compact, safe and at a very competitive price in order to compete with conventional motorization solutions.

The term "lithium metal" (or Li metal) generally defines the technology in which the anode or negative electrode comprises metal, the electrolyte contains lithium ions, and the cathode or positive electrode comprises at least one material that electrochemically reacts in a reversible manner with the lithium. The material that electrochemically reacts in a reversible manner with the lithium is, for example, an insertion material containing or not containing lithium. The electrolyte generally contains lithium ions, whether the electrolyte is liquid or a polymer loaded with lithium salt—the latter case is then generally spoken of as a dry polymer.

The term "lithium ion" (or Li ion) generally defines the technology in which the cathode comprises an insertion material comprising lithium, the anode comprises at least one material that electrochemically reacts in a reversible manner with the lithium, and the electrolyte contains lithium ions. The material that electrochemically reacts in a reversible manner with the lithium is, for example, an insertion material containing or not containing lithium or carbon. The electrolyte generally contains lithium ions, whether the electrolyte is liquid or in the form of a polymer impregnated with liquid—the latter case is then generally spoken of as a plastic electrolyte.

Lithium metal and lithium ion technology are able to meet the needs of electric vehicles, hybrid vehicles and hybrid vehicles that are rechargeable on the power grid, but remain high in cost considering the nature of the materials employed and an inadequate safety level.

The specific energy density of the above accumulators, expressed in Wh/kg of accumulator, remains an important limitation of the batteries for their application to electrical transport, for example in electric vehicles, hybrid vehicles with electrical autonomy (rechargeable or otherwise) or electrical buses. The best current batteries of the lithium-ion type have a specific energy density of between 100 and 120 Wh/kg with an even greater cost for large scale use.

The French patent application FR 2 870 639 in the name of the Applicant describes an electrode for lithium-ion or lithium-metal accumulators characterized by the presence, at the surface of the electron collector, of a layer of electrochemically active "nanostructured" material containing nanoparticles consisting of a compound, for example an oxide, the metal or metals forming the electron collector. The particular structure of the electrochemically active material enables improved performance in terms of power and specific energy density.

The specific energy density of these batteries is however always limited, due, among other things, to the limited specific capacity of the electrodes.

The specific energy density of these batteries, expressed in Wh per kg of battery, is an increasing function of the specific capacity of the positive and negative electrodes, expressed in Ah per kg of electrode. In other words, an increase in the specific capacity of the negative electrode will lead to an increase in the energy density of the battery. The specific capacity of the negative electrode can be written as follows:

$$C_m = C_s \frac{S_{geo}}{m_-} \quad (1)$$

where
$C_m$ is the specific capacity of the negative electrode (Ah/kg)
$C_s$ is the surface capacity of the negative electrode (Ah/m$^2$)
$S_{geo}$ is the geometric surface of the negative electrode (m$^2$)
$m_-$ is the mass of the negative electrode (kg).

The term "geometric surface" as used in the present application to describe the textile electrode refers to dimensions at the macroscopic scale of the metal fabric. This geometric surface is independent of the textile structure, i.e. of the number, shape and size of the wires constituting it or of the size of the fabric weave. The geometric surface therefore reflects only the bulk of the textile inside the accumulator.

The surface capacity of the negative electrode can be expressed as follows:

$$C_s = \frac{C_-}{S_{dev}} \cdot \frac{S_{dev}}{S_{geo}} \quad (2)$$

where
$C_-$ is the capacity of the negative electrode (Ah)
$S_{dev}$ is the developed surface of the negative electrode (m$^2$), and
$S_{geo}$ is the geometric surface of the negative electrode (m$^2$).

The term "developed surface" here denotes the surface of the metal fabric at the microscopic scale, in other words the real interface between the metal wires (electron collector) and the surrounding environment (before formation of the conversion layer) or the interface between the conversion layer formed at the surface of the metal wires and the environment. This surface is expressed in m$^2$.

The metal textile will also be characterized through its "specific surface", determined by the BET method and corresponding to the ratio between the "developed surface" and the "geometric surface", expressed in $m^2/m^2$.

Combining the equations (1) and (2) leads to:

$$C_m = \frac{C_-}{S_{dev}} \cdot \frac{S_{dev}}{m_-} \quad (3)$$

The value of the ratio $C_-/S_{dev}$ is linked with the chemical nature and the thickness of the electrochemically active material present in the electrode. In fact, it can be written as the product of the capacity per unit mass of active material ($C_-/m_{ma}$) and of the mass of active material per unit developed surface ($m_{ma}/S_{dev}$).

Whence:

$$C_{m-} = \frac{C}{m_{ma}} \cdot \frac{m_{ma}}{S_{dev}} \cdot \frac{S_{dev}}{m_-}$$

The capacity per unit mass of active material ($C_-/m_{ma}$) is proportional to the number of electrons involved in the equation for the electrochemical reaction occurring at the electrode. It is fixed by the chemical nature of the electrochemically active material.

The mass of active material per unit developed surface ($m_{ma}/S_{dev}$) corresponds to the product of the thickness of the layer of electrochemically active material and of the density of the active material. It is thus fixed by the chemical nature of the active material and its manufacture method, which determines the thickness of the layer.

The Applicant has found a means of increasing the specific capacity of an electrode for accumulators of the lithium-ion or lithium-metal type, and consequently the energy density of these accumulators, by configuring one of the electrodes of such an accumulator in the form of a textile based on metal fibers and/or wires (electron collector) comprising a layer of electrochemically active, nanostructured material such as described in the patent application FR 2 870 639.

The choice of a textile-type structure for one of the electrodes of such a lithium-ion or lithium-metal accumulator in fact allows, for a chemical nature and a given thickness of the layer of active material, a considerable increase in the area of the interface between the electron collector and the electrochemically active material per unit mass of the electrode ($S_{dev}/m_-$).

The subject of the present invention is therefore an electrode for a lithium-ion or lithium-metal accumulator, comprising:
(a) an electron collector containing one or more transition metals from groups IV to XII of the periodic table; and
(b) an electrochemically active material, present on the surface of the electron collector in the form of a nanostructured conversion layer containing nanoparticles or clusters of said nanoparticles, the nanoparticles having a mean diameter of between 1 and 1000 nm, preferably between 10 and 300 nm, said electrochemically active material containing at least one compound of the transition metal or transition metals present in the electron collector, characterized in that the electrode is a textile formed from metal fibers and/or wires.

As explained in the patent application FR 2 870 639, of which the present invention is a refinement, the nanostructured layer containing nanoparticles of at least one compound of a transition metal present in the electron collector is a conversion layer, i.e. a layer obtained through chemical or electrochemical transformation of the surface of the substrate metal. The known advantages of such a conversion layer are, in particular, the good adhesion of the surface layer formed to the substrate and the great ease with which such a layer can be manufactured by simple processing of the initial metal. In addition to these advantages known in the metal surface processing technology, comes a particular advantage linked with the fine textile structure of the electrode of the invention. This is because during the formation of the electrochemically active material preserving the textile structure of the electrode, i.e. not causing the openings or weave of the fabric to disappear by being blocked, is indispensable. The formation of an electrochemically active coating by depositing a coating onto the textile structure entails a significant risk of closing openings (weave) in the textile, which would cancel out the inherent advantages of such a textile structure. This risk of blocking the textile openings is obviously greater the smaller the openings. Preparing the active material by forming a conversion layer limits the risk of blocking the textile openings as no metal, nor any other material, is brought in from the outside and the microscopic dimensions (diameter and spacing of the wires) of the electrode (electron collector+active material) are thus approximately identical to those of the textile initially used.

The textile of metal wires used to form the electrode according to the invention may be a woven, non-woven or knitted textile. It is preferably a woven textile.

The metal textile used to form the electrode of the present invention is preferably formed from very thin wires, at relatively low separation from one another. In fact, the thinner the wires and the greater the number of wires per unit surface, the higher the BET specific surface, as defined above (developed surface per $m^2$ of geometric surface). The thinness of the wires may however be limited by the ability of the metals or metal alloys used to be wire drawn. While some metals and alloys such as copper, aluminum, bronze, brass, and some steels alloyed with chromium and with nickel, lend themselves well to wire drawing and can therefore be obtained in the form of very thin wires, other metals or alloys, such as ordinary steels, are more difficult to wire draw and can only be obtained in the form of relatively thick wires having an equivalent diameter of the order of several hundred micrometers.

Generally speaking, the equivalent diameter of the section of metal fibers or wires forming the initial textile or of wires of the textile electrode covered with a conversion layer of active material is between 5 μm and 1 mm, preferably between 10 μm and 100 μm, and in particular between 15 μm and 50 μm. The term "equivalent diameter" is understood to mean the diameter of the circle having the same area as the cross section of the wires.

The small equivalent diameter of the wires forming the electrode of the present invention allows them advantageously to limit the mass of the electrodes with a view to their use in accumulators. Thus, the electrode according to the invention, consisting of the electron collector covered with a conversion layer, advantageously has a unit area mass of less than 1000 $g/m^2$ of geometric surface, preferably between 10 and 500 $g/m^2$ of geometric surface.

As explained in the introduction, the main objective of the present invention is to propose electrodes for lithium-ion or lithium-metal accumulators having a maximum active surface for a minimum electron collector mass (cost reduction linked with the metal raw material) and a minimum bulk (miniaturization of accumulators). By using metal textiles such as described above, the Applicant has succeeded in preparing electrodes having a specific surface (expressed per unit surface) of between 2 and 100 m²/m², preferably between 20 and 80 m²/m², of geometric surface of the electrode, or a developed surface per unit mass of the electrode of between $10^{-3}$ and 5 m²/g, preferably between $10^{-2}$ and 3 m²/g of electrode.

The electrode according to the present invention is distinguished from that disclosed and claimed by the Applicant in the application FR 2 870 639 mainly through its textile structure. With regard to the chemical composition of the electron collector and of the conversion layer, the technical characteristics of the electrode of the present invention are similar to those disclosed in FR 2 870 639, except that it is necessary to select from the metals and metal alloys disclosed in this document those having an appropriate ability to be wire drawn and woven.

In a preferred embodiment of the invention, said transition metal(s) of the electron collector is (are) chosen from the group formed of nickel, cobalt, manganese, copper, chromium and iron, preferably from iron and chromium.

During the formation of the conversion layer forming the active material of the electrode according to the invention, these metals are converted by an appropriate process, described in greater detail below, into a compound of said transition metal(s). This compound is preferably a mineral compound and is advantageously chosen from the chalcogenides and the halides, preferably from the chalcogenides (oxygen, sulfur, selenium, tellurium), and the metal compound present in the conversion layer is particularly preferably a metal oxide.

In a particularly preferred embodiment of the invention, the transition metal compound is a compound of the formula:

$$M_xO_y,$$

where $1 \leq x \leq 3$ and $1 \leq y \leq 5$, preferably $1 \leq y \leq 4$, and M is at least one transition metal. This compound is preferably chosen from the group formed by the spinelle structures $AB_2O_4$, where A is at least one transition metal chosen from the group formed by Fe, Mn, Cr, Ni, Co and Cu, and B is at least one metal chosen from the group formed by Fe, Cr and Mn, and/or from the group formed by the sesquioxides $M'_2O_3$, where M' is at least one transition metal chosen from the group formed by Fe, Mn, Cr, Ni, Co and Cu.

The transition metal compound is in particular $Cr_2O_3$ or a compound corresponding to the formula:

$$Fe_{x'}Cr_{y'}Mn_{z'}O_4,$$

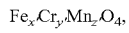

where: $0 \leq x' \leq 1$, $0 \leq z' \leq 1$, and $x'+y'+z'=3$.

The valency of M is preferably equal to 2 or 3, in particular equal to 3. The compounds of the formula $Fe_{x'}Cr_{y'}Mn_{z'}O_4$ encompass, for example, compounds of the formula $Fe_{x'}Cr_{1-x'}Cr_2O_4$, where x' has the value indicated above.

As previously mentioned, the conversion layer of the textile electrode of the present invention is a "nanostructured" layer containing nanoparticles having a mean diameter of between 1 and 1000 nm, preferably between 10 and 300 nm. Such a nanostructured layer is distinguished by a rough and porous structure, and contains at least 50% by weight, preferably at least 70% by weight, of nanoparticles.

In the conversion layer of the textile electrode, the nanoparticles are preferably rearranged and clustered with one another, the clusters preferably having a mean size of between 1 and 10 000 nm, in particular between and 3000 nm. The porous structure based on nanoparticle clusters can be demonstrated, for example, by scanning electron microscopy.

The conversion layer (electrochemically active material) preferably completely covers the surface of the electron collector and preferably has a thickness of between 30 nm and 15 000 nm, in particular between 30 nm and 12 000 nm.

According to one particularly advantageous embodiment, the electron collector is a fabric formed from an alloy containing chromium, for example, an alloy of iron and chromium. The electron collector is preferably made of stainless steel.

Metal fabrics based on transition metals able to be used, after formation of a nanostructured conversion layer as described above, as the electrode of a lithium-ion or lithium-metal accumulator are known in the prior art and are available on the market, for example, under the following denominations: plain square weave, twill square weave, plain weft rib, twill weft rib, plain warp rib, twill warp rib.

The formation of the nanostructured conversion layer is described in the application FR 2 870 639. The treatment used in that document can be applied without further precautions or modifications to the metal textiles described above. Said conversion treatment is, for example, a high-temperature heat treatment in a reducing, neutral or oxidizing atmosphere. These treatments are treatments known to the person skilled in the art and are commonly employed.

It may, for example, be a treatment in hydrogen at a temperature of between 500 and 1000° C., preferably between 600 and 800° C., for example at a temperature close to 700° C., for a duration of from 1 hour to 16 hours.

In may also be a heat treatment in air at a temperature between, for example, 600 and 1200° C., preferably between 800 and 1150° C., for example at a temperature close to 1000° C., for a duration of from 1 minute to 16 hours.

The conversion layer formed at the end of the oxidizing or reducing heat treatment does not generally have the definitive nanostructured structure sought for the textile electrode of the invention. The final nanostructuration of the electrode, i.e. the formation of nanoparticles, occurs only during the first discharge of the accumulator. It is of course possible to subject the textile electrode to such a discharge before incorporating it in a lithium accumulator. This first discharge can be effected, for example, by reducing the textile electrode relative to a lithium electrode in an organic electrolyte containing lithium salt at a low current density (0.05 to 0.5 mA/cm² of geometric surface of the electrode) up to a potential of 20 mV relative to the lithium, then oxidation of said textile electrode at a low current density (0.05 to 0.5 mA/cm² of geometric surface of the electrode) up to a potential of 3000 mV relative to the lithium.

The subject of the present invention is in addition an electrochemical half-accumulator and an electrochemical accumulator containing a textile electrode such as described above.

An electrochemical half-accumulator according to the invention comprises a textile electrode with a nanostructured conversion layer, such as previously described, said textile electrode being covered over its entire surface with a coating that ensures it functions to separate the battery electrodes. This coating is designed to separate electrically the two electrodes of the accumulator. This separator must furthermore be able to be impregnated with a liquid electrolyte comprising at least one lithium salt and therefore preferably has a porous structure or a polymer structure that can be inflated by the electrolyte. In order to preserve the advantages resulting directly from the textile structure of the electrode of the present invention, i.e. a high specific surface that converts into a large specific capacity and energy density, it is essential to carry out the deposition of the separator in such a way that this textile structure always appears in the half-accumulator. In other words, the deposition of the separator must not block the openings or weave of the metal textile forming the electrode, but must preferably preserve at least 50%, in particular at least 70% and ideally all, of the openings in the initial metal textile. The blocking or the preservation of these openings depends, inter alia, on the thickness of the separator deposited. This must have a small enough thickness for at least some of the openings of the textile electrode not to be closed by said separator.

Although the deposition of such a separator can be carried out by various suitable methods, such as immersion, spraying or chemical vapor deposition, the deposition of this coating is preferably carried out by electrochemical means and in particular according to a technique known by the name cataphoresis. This technique in which the metal structure or the wire to be coated is introduced, as a cathode, into an aqueous solution containing the base components of the coating to be deposited, in fact enables an extremely thin, regular and continuous, deposit covering the whole of the surface of a structure, even with a very complex geometry. In order to be able to migrate toward the cathode, i.e. toward the structure or the wire to be coated, the component to be deposited must have a positive charge. It is known, for example, to use cationic monomers which, after deposition on the cathode and polymerization, form an insoluble polymer coating.

In a preferred embodiment of the half-accumulator of the present invention, the separator is deposited by cataphoresis from an aqueous solution containing such cationic monomers, preferably cationic monomers comprising quaternary amine functions.

In a preferred embodiment of the half-accumulator of the present invention, the separator is deposited by cataphoresis from said aqueous solution onto the textile electrode with a nanostructured conversion layer, as previously described. It is, however, also possible to conceive an embodiment in which the separator is deposited by cataphoresis, from said aqueous solution, onto the metal fibers or wires having a nanostructured conversion layer, as previously described, before these are assembled, for example, by a weaving or knitting technique to produce a textile structure.

The half-accumulator described above, formed by the textile electrode coated with a separator, may be incorporated into an electrochemical accumulator, which is the subject of the present invention, comprising, apart from said half-accumulator, a liquid electrolyte impregnating the separator of the half-accumulator and an electrode with a polarity opposed to that of the half-accumulator, preferably completely covering the surface of the separator impregnated by the electrolyte.

In a preferred embodiment of the present invention, the accumulator is a lithium-ion accumulator comprising:
 (i) a half-accumulator as described above, comprising an anode with a separator;
 (ii) a liquid electrolyte containing a lithium salt, impregnating the separator of the half-accumulator;
 (iii) as a cathode, a mixture comprising a lithium ion insertion material, a polymer binder and a secondary electronic conductor, covering the surface of the separator impregnated with electrolyte; and
 (iv) a collector of current from the cathode, for example made of aluminum.

Liquid electrolytes comprising a lithium salt, used in lithium-ion accumulators, are known to the person skilled in the art. By way of example, it is possible to mention the lithium salts $LiCF_3SO_3$, $LiClO_4$, $LiN(C_2F_5SO_2)_2$, $LiN(CF_3SO_2)_2$, $LiAsF_6$, $LiSbF_6$, $LiPF_6$ and $LiBF_4$. Said salt is preferably chosen from the group formed by $LiCF_3SO_3$, $LiClO_4$, $LiPF_6$ and $LiBF_4$.

In general, said salt is dissolved in an anhydrous organic solvent, generally consisting of mixtures in variable proportions of propylene carbonate, dimethyl carbonate and ethylene carbonate. Thus, said electrolyte generally comprises, as is known to the person skilled in the art, at least one cyclic or acyclic carbonate, preferably a cyclic carbonate. For example, said electrolyte is of LP30, a commercial compound from the company Merck comprising EC (ethylene carbonate), DMC (dimethyl carbonate), and $LiPF_6$ salt, the solution being 1 molar in salt and 50%/50% by weight in solvent.

The cathode of the lithium-ion accumulator comprises, for example, in a known manner, at least one lithium ion insertion material, such as $LiCoO_2$, $LiFePO_4$, $LiCO_{1/3}Ni_{1/3}Mn_{1/3}O_2$ or $LiMn_2O_4$ or a compound of the type $LiMX_2$, where M is a transition metal and X represents a halogen atom.

In contrast to what has been explained previously, for the deposition of the separator on the textile electrode it is not essential that said textile structure of the electrode is always apparent after deposition of the material forming the electrode of opposite charge, in particular the cathode of the lithium-ion accumulator. In other words, the material forming the electrode with a polarity opposed to that of the textile electrode preferably fills at least some of the openings or weave of the half-accumulator, the accumulator then appearing in the form of a continuous sheet or an assembly of sheets, each sheet containing the textile structure described above.

In one particular embodiment of the accumulator of the present invention, the accumulator comprises a textile structure providing not only the electrode and separator functions, i.e. the half-accumulator function, but also the function of current collector for the electrode of opposite polarity. The half-accumulator function is then provided, for example, by the warp wires of the textile structure and that of current collector for the electrode of opposite polarity by the weft wires, or vice versa. In this case, the warp wires are metal wires consisting of one or more transition metals from groups IV to XII of the periodic table with a nanostructured conversion layer and overlaid with a separator coating, as previously described. The weft wires are metal wires that are able to serve as a current collector for the positive electrode, for example made of aluminum.

The subject of the present invention is therefore furthermore a lithium-ion accumulator comprising:
 (i) a textile structure comprising both (a) metal wires containing one or more transition metals from groups IV to XII of the periodic table having a nanostructured conversion layer containing nanoparticles with a mean diameter of between 1 and 1000 nm and containing at least one compound of said transition metal(s), providing the negative electrode function, said metal wires (a) being covered over their entire surface by a separator; and (b) metal wires suitable as an electron collector for the positive electrode;
 (ii) a liquid electrolyte containing a lithium salt, impregnating the separator of the half-accumulator;
 (iii) as cathode, a mixture comprising a lithium ion insertion material, a polymer binder and a secondary electronic conductor, the mixture covering the entire surface of the textile structure (i) comprising the separator impregnated with electrolyte (ii).

The subject of the invention is in addition the use of an accumulator, as previously described, as a battery for hybrid vehicles (rechargeable or otherwise), electric vehicles, portable devices and stationary applications.

The subject of the invention is finally a supercapacitor comprising a textile electrode according to the present invention.

BRIEF DESCRIPTION OF THE DRAWINGS

FIG. 1 shows a diagram of a half-accumulator according to the invention, viewed from above (FIG. 1A) and in cross section (FIG. 1B) through the line AA' of FIG. 1A.

FIG. 1 shows a diagram of a half-accumulator according to the invention, viewed from above (FIG. 1A) and in cross section (FIG. 1B) through the line AA' of FIG. 1A. Such a half-accumulator 200 comprises an electron collector 100, typically in the fabric form seen in its segment in FIG. 1A, on the surface of which a layer 101 of active material has been produced. This layer of active material has been produced by heat treatment, for example in air at high temperature, of the collector 100. The collector 100 is typically made of stainless steel. Chromium (Cr), iron (Fe) and manganese (Mn), which are constituents of the collector 100, have reacted with oxygen ($O_2$) from the air to form oxides based mainly on chromium in the form of nanoparticles. No external material has been added, such as a secondary electronic conductor like carbon black, a binder or another metal. On this collector 100 and its nanostructured conversion layer 101 a separator film 102 has been deposited, typically by a cataphoresis process, in the form of a thin film completely covering the surface of the wires of the metal fabric with their conversion layer. This coating 102 has been deposited so as not to block the openings 103 of the fabric, which can be distinguished in FIG. 1A. This separator has the particular feature of being able to be impregnated with a liquid electrolyte for a lithium-ion battery.

The invention claimed is:

1. An electrode comprising:
(a) an electron collector containing one or more transition metals from groups IV to XII of the periodic table; and
(b) an electrochemically active material, present on the surface of the electron collector in the form of a nanostructured conversion layer containing nanoparticles or clusters of said nanoparticles, the nanoparticles having a mean diameter of between 1 and 1000 nm, said electrochemically active material containing at least one compound of the transition metal or transition metals present in the electron collector,
characterized in that the electrode is a textile formed from metal wires,
wherein said electrode has a unit area mass of less than 1000 $g/m^2$ of geometric surface,
wherein said electrode has a specific surface, expressed per unit surface, of between 2 and 100 $m^2/m^2$ of geometric surface of the electrode and
wherein said electrode has a developed surface per unit mass of the electrode of between $10^{-3}$ and 5 $m^2/g$ of the electrode.

2. The electrode as claimed in claim 1 wherein the textile of metal wires is a woven, non-woven or knitted textile.

3. The electrode as claimed in claim 1 wherein an equivalent diameter of the section of wires of the textile electrode covered with a conversion layer of active material is between 5 μm and 1 mm.

4. The electrode as claimed in claim 1, wherein said transition metal(s) of the electron collector is (are) chosen from the group consisting of nickel, cobalt, manganese, copper, chromium and iron.

5. The electrode as claimed in claim 1, wherein the transition metal compound(s) is (are) chosen from chalcogenides and halides.

6. The electrode as claimed in claim 5, wherein the transition metal compound(s) is (are) chosen from oxides.

7. The electrode as claimed in claim 6, wherein the transition metal (M) compound(s) is (are) chosen from those of formula $M_xO_y$, where: $1 \leq x \leq 3$ and $1 \leq y \leq 5$.

8. The electrode as claimed in claim 7, wherein the transition metal (M) compound(s) is (are) selected from spinelle structures of formula $AB_2O_4$, where A is at least one transition metal chosen from the group consisting of Fe, Mn, Cr, Ni, Co and Cu, and B is at least one transition metal chosen from the group formed by Fe, Cr and Mn, and sesquioxides $M'_2O_3$, where M' is at least one transition metal chosen from Fe, Mn, Cr, Ni, Co and Cu.

9. The electrode as claimed in claim 7, wherein the transition metal compound is chosen from those of formula $Fe_xCr_yMn_zO_4$, where: $0 \leq x' \leq 1$, $0 \leq z' \leq 1$, and $x'+y'+Z'=3$, and $Cr_2O_3$.

10. The electrode as claimed in claim 1, wherein the electrochemically active material completely covers the surface of the electron collector in the form of a conversion layer having a thickness of between 30 nm and 15 000 nm.

11. The electrode as claimed in claim 1, wherein the electron collector is made of stainless steel.

12. An electrochemical half-accumulator comprising the textile electrode as claimed in claim 1, said textile electrode being covered over its entire surface with a separator, and said separator having a small enough thickness for at least some openings of the textile electrode not to be closed by said separator.

13. The electrochemical half-accumulator as claimed in claim 12, wherein the separator comprises a cationic polymer.

14. An electrochemical accumulator comprising:
(i) the half-accumulator as claimed in claim 12 or 13;
(ii) a liquid electrolyte impregnating the separator of the half-accumulator; and
(iii) an electrode of polarity opposite to that of the half-accumulator, completely covering the surface of the separator impregnated with electrolyte.

15. The electrochemical accumulator as claimed in claim 14 comprising:
(i) the half-accumulator comprising an anode with the separator;
(ii) the liquid electrolyte containing a lithium salt, impregnating the separator of the half-accumulator;
(iii) as a cathode, a mixture comprising a lithium ion insertion material, a polymer binder and a secondary electronic conductor, covering the surface of the separator impregnated with electrolyte; and
(iv) a collector of current from the cathode.

16. A supercapacitor comprising an electrode as claimed in claim 1.

17. The electrode as claimed in claim 1, wherein the nanoparticles have a mean diameter of between 10 and 300 nm.

18. A lithium-ion accumulator comprising:
(i) a textile structure comprising both (a) metal wires containing one or more transition metals from groups IV to XII of the periodic table having a nanostructured conversion layer containing nanoparticles with a mean diameter of between 1 and 1000 nm and containing at least one compound of said transition metal(s), providing a negative electrode function, said metal wires being covered over their entire surface by a separator; and (b) metal wires suitable as an electron collector for positive electrode;
(ii) a liquid electrolyte containing a lithium salt, impregnating the separator (iii) as cathode, a mixture comprising a lithium ion insertion material, a polymer binder and a secondary electronic conductor, the mixture covering the entire surface of the textile structure (i) comprising the separator impregnated with electrolyte (ii).

* * * * *